(12) United States Patent
Chu et al.

(10) Patent No.: US 11,724,348 B2
(45) Date of Patent: Aug. 15, 2023

(54) SUPPLEMENTARY MECHANISM THAT PROVIDES A TEMPERATURE RISE AND FALL EFFECT TO A MACHINE TOOL SPINDLE

(71) Applicant: SURPASS WORLD TECHNOLOGY CO., LTD., Taichung (TW)

(72) Inventors: Chun-Hsien Chu, Taichung (TW); Tung-Yang Lee, Taichung (TW)

(73) Assignee: SURPASS WORLD TECHNOLOGY CO., LTD., Taichung (TW)

( * ) Notice: Subject to any disclaimer, the term of this patent is extended or adjusted under 35 U.S.C. 154(b) by 717 days.

(21) Appl. No.: 15/930,920

(22) Filed: May 13, 2020

(65) Prior Publication Data
US 2020/0368868 A1 Nov. 26, 2020

(30) Foreign Application Priority Data

May 20, 2019 (TW) .................................. 108117350
Jun. 11, 2019 (TW) .................................. 108120131

(51) Int. Cl.
| | | |
|---|---|---|
| F16K 31/02 | (2006.01) | |
| B23Q 11/12 | (2006.01) | |
| F16K 11/10 | (2006.01) | |
| F16K 31/00 | (2006.01) | |

(52) U.S. Cl.
CPC .......... B23Q 11/127 (2013.01); F16K 11/105 (2013.01); F16K 31/002 (2013.01)

(58) Field of Classification Search
CPC .... B23Q 11/127; F16K 11/105; F16K 31/002
See application file for complete search history.

(56) References Cited

U.S. PATENT DOCUMENTS

2019/0118323 A1* 4/2019 Koshiishi ........... B23Q 11/1015
2019/0270170 A1* 9/2019 Arai ..................... B23Q 11/126

FOREIGN PATENT DOCUMENTS

TW        I593501 B      8/2017
TW    202114808 A  *  4/2021    ......... B23Q 11/0003

OTHER PUBLICATIONS

Translation of Foreign document TW202114808A published Jan. 11, 2020 (Year: 2020).*

* cited by examiner

*Primary Examiner* — P. Macade Nichols
(74) *Attorney, Agent, or Firm* — Birch, Stewart, Kolasch & Birch, LLP

(57) ABSTRACT

A supplementary mechanism that provides a temperature rise and fall effect to a machine tool spindle is mainly used to connect to pipelines between a machine tool spindle and a cooling device. The present invention provides an additional heating function to the spindle of the machine tool that originally has a cooling device, and still retains its original cooling function. The supplementary mechanism can provide the effect of raising and lowering the temperature. When cooling, the liquid provided by the cooling device is passed to directly cool the machine tool spindle. When raising the temperature, the flow path is switched, so that the liquid of the cooling device cannot flow to the machine tool spindle, and the liquid flowing out of the machine tool spindle forms an independent circulation channel, and the supplementary mechanism heats the liquid in the independent circulation channel, achieving the effect of rapid heating.

9 Claims, 9 Drawing Sheets

SUPPLEMENTARY MECHANISM THAT PROVIDES A TEMPERATURE RISE AND FALL EFFECT TO A MACHINE TOOL SPINDLE

BACKGROUND OF THE INVENTION

1. Field of the Invention

The present invention relates to machine tool temperature control technology and more particularly, to a supplementary mechanism that provides a temperature rise and fall effect to a machine tool spindle.

2. Description of the Related Art

The existing technology for cooling the machine tool mainly uses a storage tank to contain a liquid coolant, and the storage tank is cooled by a cooling device, so that the cooled liquid coolant flows to the machine tool to lower the temperature.

Taiwan Patent Number I593501 discloses a constant temperature control system for machine tools and a flow path switching valve, which is mainly used to adjust the temperature of a machine tool during operation, thereby improving the machining accuracy and quality of the machine tool. The main technical measure to achieve the above function is to use its storage tank, pump, cooling device and flow path switching valve to provide cooling effect, which makes the temperature falls. In terms of heating, a temperature sensor and a heating device are additionally provided, which makes the temperature raises.

Although the aforementioned known technology utilizes a cooling device and a heating device to cool and heat the liquid in the storage tank, the liquid coolant is pumped into the accommodating cylinder of the machine tool to adjust the operating temperature of the machine tool. However, in actual operation, it is not easy to achieve temperature control. Because, whether it is heating or cooling, the liquid coolant flows back into the storage tank or is heated directly in the storage tank after cooling, however, the amount of liquid in the storage tank is much larger than the amount of liquid in the pipeline, therefore, after the heated or cooled liquid flows back into the storage tank, the effect on the temperature of the liquid in the entire storage tank is very limited. Looking further, whether it is heating or cooling, it takes a considerable amount of time and considerable power to increase or decrease the temperature of the liquid in the entire storage tank. In this way, it is impossible to provide rapid heating or cooling, and can only wait a long time for the liquid in its storage tank to warm up or cool down, till then it can finally produce effective temperature adjustment effects on the machine tool. In addition, the aforementioned technology also needs to modify the cooling device that the machine tool originally cooperated with to effectively work, and the modification changes the original structure, which is also more likely to cause problems.

It can be seen that the aforementioned known technology has the problem of extremely slow temperature adjustment speed, which is not suitable for the occasions where high temperature adjustment speed is required, and there is also the problem of needing to modify the original cooling device or storage tank.

Judging from the aforementioned known technology, it has the problem of a very slow temperature adjustment speed. Such a technology cannot meet the occasions where the temperature needs to be adjusted quickly.

In addition, the aforementioned temperature adjustment device needs to modify the original cooling device or storage tank. There will also be problems of increased costs due to modification and possible failure after modification.

SUMMARY OF THE INVENTION

The present invention has been accomplished under the circumstances in view. It is the main objective of the present invention to provide a supplementary mechanism that provides a temperature rise and fall effect to a machine tool spindle, which can provide a rapid heating effect when you want to increase the temperature of the machine tool spindle, in addition, there is no need to modify the cooling device originally used with the machine tool.

To achieve this and other objects of the present invention, a supplementary mechanism that provides a temperature rise and fall effect to a machine tool spindle is mainly used to connect to pipelines between a machine tool spindle and a cooling device. The supplementary mechanism comprises: a cold liquid shortcut channel, a cold liquid electrical control valve connected to one end of the cold liquid shortcut channel for the liquid of the cooling device to enter, a return valve connected to an opposite end of the cold liquid shortcut channel for the liquid to flow out to the cooling device, a hot liquid shortcut channel, a hot liquid electrical control valve connected to one end of the hot liquid shortcut channel and also connected to the return valve, a discharge valve connected to one end of the hot liquid shortcut channel and also connected to the cold liquid electrical control valve, a liquid outlet channel having one end thereof connected to the discharge valve and an opposite end thereof provided for a liquid to flow out to the machine tool spindle, a reflux liquid inlet channel having one end thereof connected to the hot liquid electrical control valve and an opposite end thereof provided for the liquid returning from the machine tool spindle to enter, and a pump installed on one of the hot liquid shortcut channel, the reflux liquid inlet channel and the liquid outlet channel and controlled by a control source to drive the liquid therein to move. The discharge valve is to ensure that the liquid flowing through only flows to the liquid outlet channel. The return valve is to ensure that the liquid flowing through only flows to the cooling device. The control source controls the cold liquid electrical control valve and the hot liquid electrical control valve to switch the liquid flow direction. When the control source controls the cold liquid electrical control valve so that the liquid flowing from the cooling device can only flow to the discharge valve, the control source also controls the hot liquid electrical control valve so that the liquid flowing from the reflux liquid inlet channel can only flow to the return valve. When the control source controls the cold liquid electrical control valve so that the liquid flowing from the cooling device can only flow to the cold liquid shortcut channel, the control source also controls the hot liquid electrical control valve so that the liquid flowing from the reflux liquid inlet channel can only flow to the hot liquid shortcut channel.

In this way, the present invention can provide an additional heating function to the spindle of the machine tool that originally has a cooling device, and still retains its original cooling function, and can provide the effect of quickly raising the temperature of the machine tool spindle when the temperature is raised. In addition, the present invention does not require modification of the cooling device originally used with the machine tool, and solves the aforementioned problems of the prior art.

DETAILED DESCRIPTION OF THE INVENTION

Figure 1:
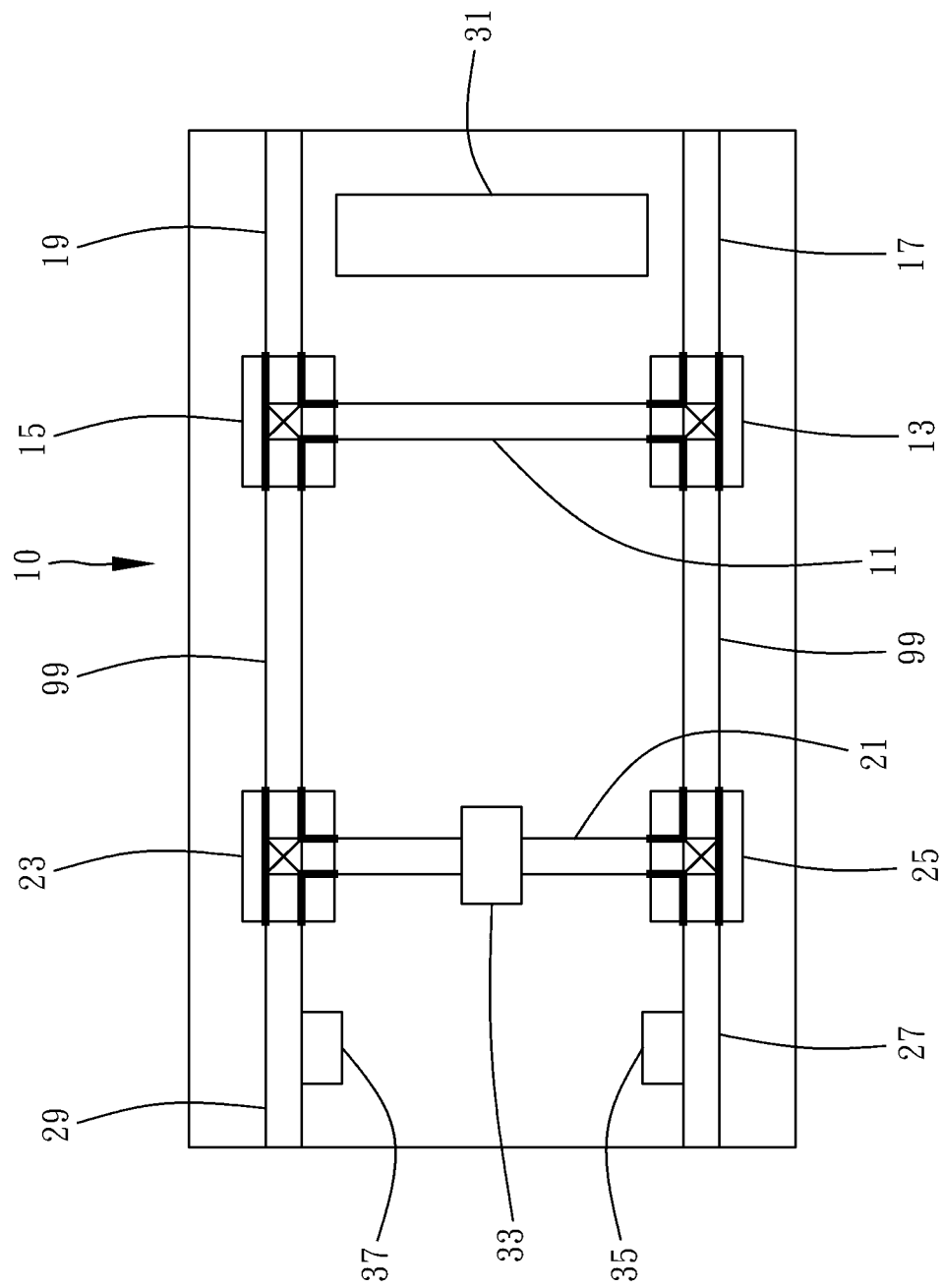
FIG. 1 is a system block diagram of a first preferred embodiment of the present invention.
Figure 2:
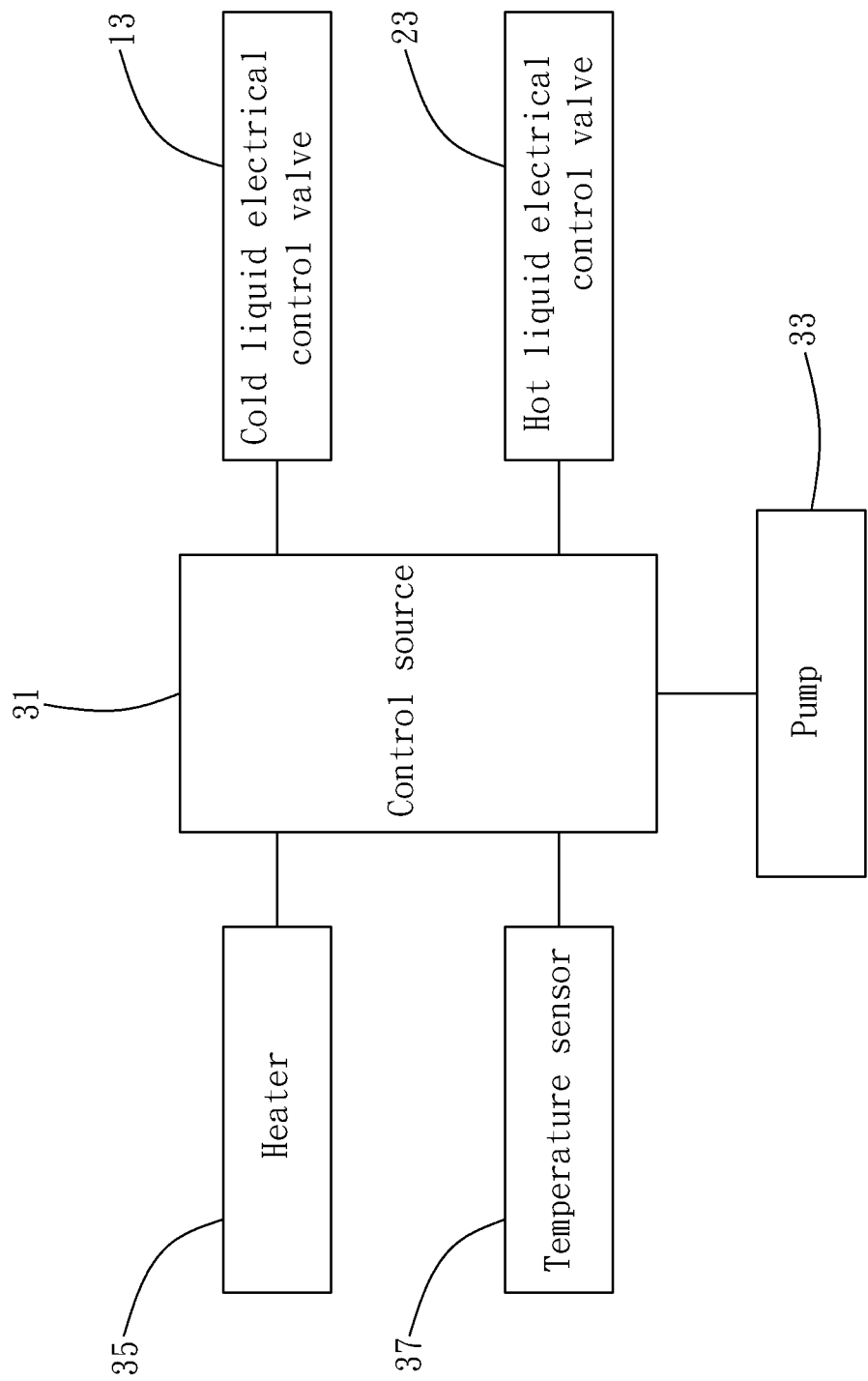
FIG. 2 is a circuit block diagram of the first preferred embodiment of the present invention.

Referring to FIGS. 1 and 2, a supplementary mechanism 10 that provides a temperature rise and fall effect to a machine tool spindle is mainly used to connect to pipelines between a machine tool spindle 81 and a cooling device 91. The supplementary mechanism 10 is mainly composed of a cold liquid shortcut channel 11, a cold liquid electrical control valve 13, a return valve 15, a hot liquid shortcut channel 21, a hot liquid electrical control valve 23, a discharge valve 25, a control source 31, a liquid inlet channel 17, a liquid outlet channel 27, a reflux liquid inlet channel 29, a reflux liquid release channel 19, a pump 33, a heater 35, and a temperature sensor 37.

The cold liquid electrical control valve 13 is connected to one end of the cold liquid shortcut channel 11. In this embodiment, the cold liquid electrical control valve 13 is a three-way solenoid valve.

The return valve 15 is connected to an opposite end of the cold liquid shortcut channel 11. In this embodiment, the return valve 15 is a three-way check valve with two inputs and one output.

The hot liquid electrical control valve 23 is connected to one end of the hot liquid shortcut channel 21, and also connected to the return valve 15 by a tube 99. In this embodiment, the hot liquid electrical control valve 23 is a three-way solenoid valve.

The discharge valve 25 is connected to one end of the hot liquid shortcut channel 21, and also connected to the cold liquid electrical control valve 13 by a tube 99. In this embodiment, the discharge valve 25 is a three-way check valve with two inputs and one output.

The control source 31 is a microcomputer, electrically connected to the cold liquid electrical control valve 13 and the hot liquid electrical control valve 23.

The liquid inlet channel 17 has one end thereof connected to the cold liquid electrical control valve 13, and an opposite end thereof provided for the liquid of the cooling device 91 to enter.

The liquid outlet channel 27 has one end thereof connected to the discharge valve 25, and an opposite end thereof provided for the liquid to flow out to the machine tool spindle 81.

The reflux liquid inlet channel 29 has one end thereof connected to the hot liquid electrical control valve 23, and an opposite end thereof provided for the liquid returning from the machine tool spindle 81 to enter.

The reflux liquid release channel 19 has one end thereof connected to the return valve 15, and an opposite end thereof provided for the liquid to flow out to the cooling device 91.

The pump 33, installed on the hot liquid shortcut channel 21 and electrically connected to the control source 31, is controlled by the control source 31 to drive the liquid in the hot liquid shortcut channel 21 to the discharge valve 25.

The heater 35, installed on the liquid outlet channel 27 and electrically connected to the control source 31, is controlled by the control source 31 to heat the liquid in the liquid outlet channel 27.

The temperature sensor 37 is installed on the reflux liquid inlet channel 29 and electrically connected to the control source 31.

In the present first embodiment, the discharge valve 25 ensures that the liquid flowing through only flows to the liquid outlet channel 27, the return valve 15 ensures that the liquid flowing through only flows to the reflux liquid release channel 19. In addition, the control source 31 controls the cold liquid electrical control valve 13 and the hot liquid electrical control valve 23 to switch the liquid flow direction. When the control source 31 controls the cold liquid electrical control valve 13 so that the liquid flowing from the liquid inlet channel 17 can only flow to the discharge valve 25, the control source 31 simultaneously controls the hot liquid electrical control valve 23 so that the liquid flowing from the reflux liquid inlet channel 29 can only flow to the return valve 15. When the control source 31 controls the cold liquid electrical control valve 13 so that the liquid flowing from the liquid inlet channel 17 can only flow to the cold liquid shortcut channel 11, the control source 31 simultaneously controls the hot liquid electrical control valve 23 so that the liquid flowing from the reflux liquid inlet channel 29 can only flow to the hot liquid shortcut channel 21.

The structure of the first preferred embodiment of the present invention has been described above, and then the operation state of the first preferred embodiment will be described.

Figure 3:
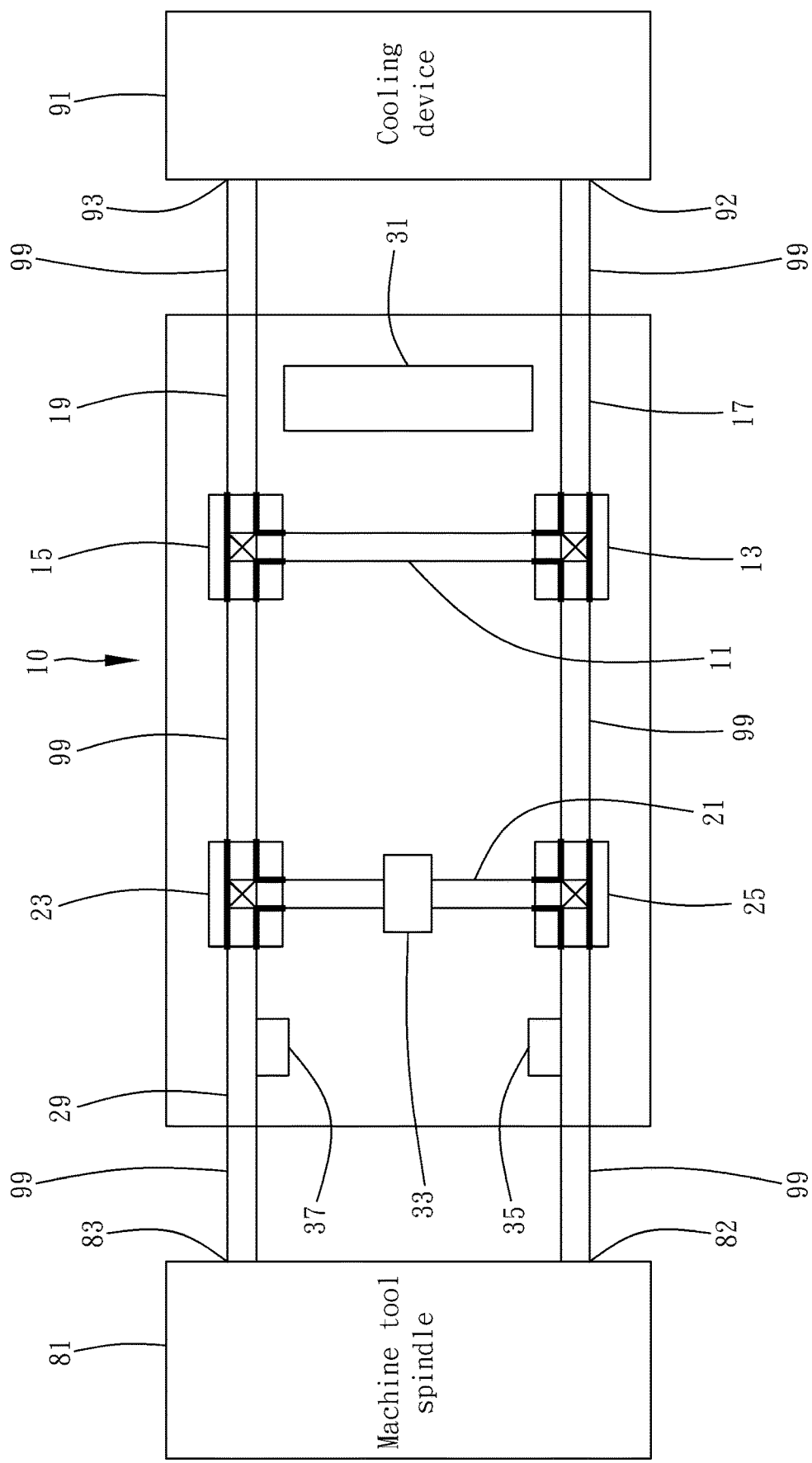
FIG. 3 is an installation state diagram of the first preferred embodiment of the present invention.

As shown in FIG. 3, before use, it is needed to install the present invention on the pipelines between a machine tool spindle 81 and a cooling device 91. Since the conventional machine tool with a cooling device 91 usually has a delivery pipe and a return pipe used as liquid coolant (hereinafter referred to as liquid) circulation channels between the machine tool and the spindle, and the cooling device 91 itself has a water storage tank, a cooling compressor and a driving device for driving liquid, so it can be operated independently for cooling. When installing the present invention, the delivery pipe and the return pipe should be cut, and the present invention can be connected to the cut pipe mouths of the two pipes, or the old delivery and return pipes can be replaced by a respective new pipe. In this first preferred embodiment, new pipelines installation is taken as an example. After installation, the liquid outlet 92 of the cooling device 91 is connected to the liquid inlet channel 17 through a tube 99, and the liquid outlet channel 27 is connected to the liquid inlet 82 of the machine tool spindle 81 through a tube 99. In addition, the liquid outlet 83 of the machine tool spindle 81 is also connected to the reflux liquid inlet channel 29 by a tube 99, and the reflux liquid release channel 19 is connected to the reflux port 93 of the cooling device 91 by a tube 99. Wherein, the liquid inlet channel 17, the liquid outlet channel 27, the reflux liquid inlet channel 29, the reflux liquid release channel 19, the cold liquid shortcut channel 11, the hot liquid shortcut channel 21 and the machine tool spindle 81 are fully filled with the liquid.

Figure 4:
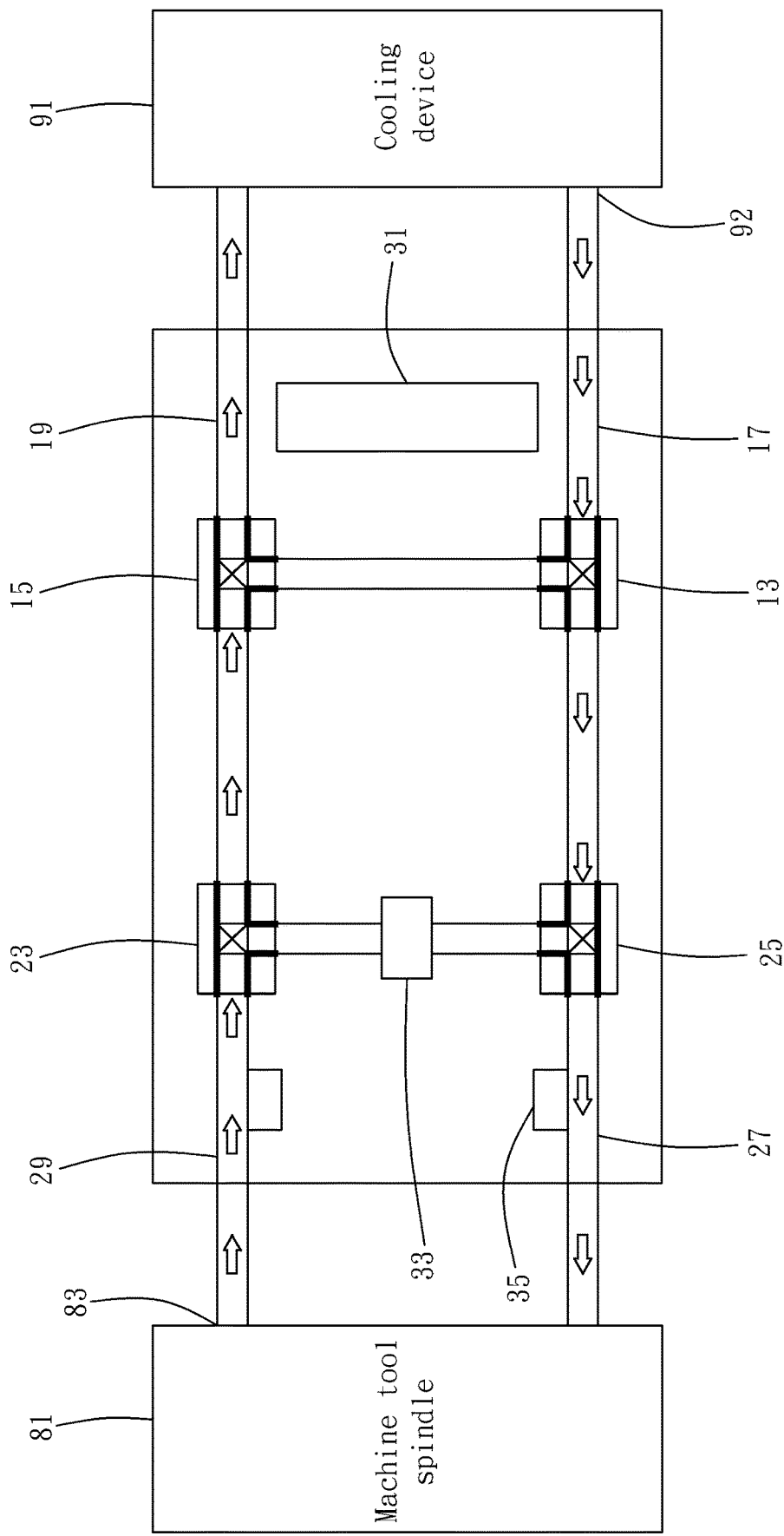
FIG. 4 is a schematic operational diagram of the first preferred embodiment of the present invention.

As shown in FIG. 4, in operation, taking the cooling operation as an example, the user can issue commands to the control source 31 to perform the cooling operation. The control source 31 controls the cold liquid electrical control valve 13 to make the liquid only flow to the discharge valve 25, and controls the hot liquid electrical control valve 23 to make the liquid only flow to the return valve 15, and controls the pump 33 and the heater 35 not to operate. At this time, the liquid flowing out of the liquid outlet 92 of the cooling device 91 enters the liquid inlet channel 17, passes through the cold liquid electrical control valve 13, the discharge valve 25 and the liquid outlet channel 27 and enters the machine tool spindle 81, to provide a cooling effect. After the liquid absorbs heat in the machine tool spindle 81, it flows out of the liquid outlet 83 of the machine tool spindle 81 and enters the reflux liquid inlet channel 29, and flows through the hot liquid electrical control valve 23, the return valve 15 and the reflux liquid release channel 19 and back to the cooling device 91. It can be seen that when cooling, the present invention only passes the liquid provided by the original cooling device 91 to form the same cooling circulation path as the conventional cooling device to cool the machine tool spindle 81.

Figure 5:
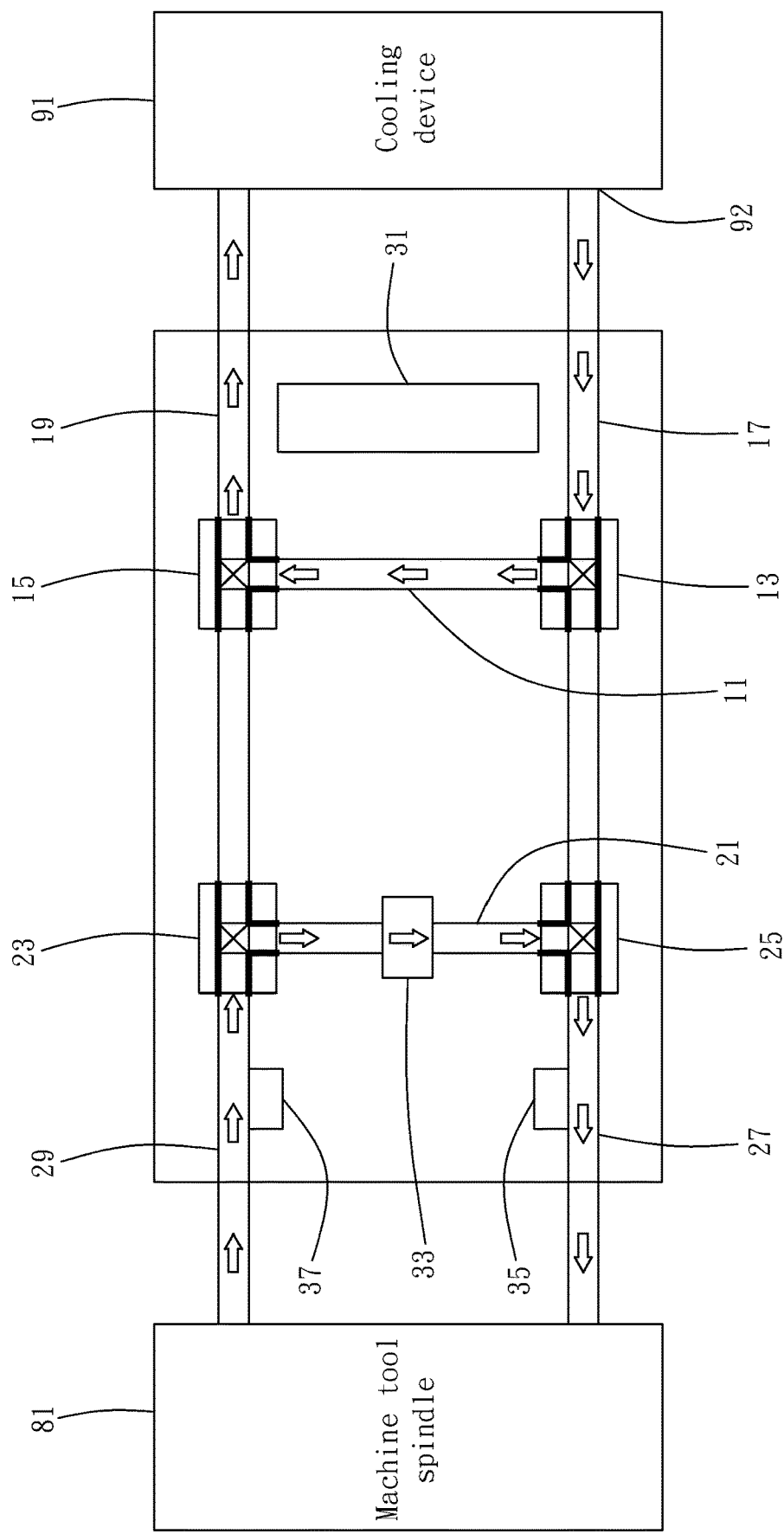
FIG. 5 is another schematic operational diagram of the first preferred embodiment of the present invention.

As shown in FIG. 5, when performing the heating (temperature raising) operation, the user can issue commands to the control source 31 to perform the heating operation. The control source 31 controls the cold liquid electrical control valve 13 to make the liquid only flow to the cold liquid shortcut channel 11, and controls the hot liquid electrical control valve 23 to make the liquid only flow to the hot liquid shortcut channel 21, and the control source 31 also controls the pump 33 to operate and controls the heater 35 to start heating. At this time, the liquid flowing out of the liquid outlet 92 of the cooling device 91, after entering the liquid inlet channel 17, is switched to the cold liquid shortcut channel 11 by the switching of the cold liquid electrical control valve 13, and then passes through the return valve 15 and the reflux liquid release channel 19 to reflux into the cooling device 91. That is, the liquid flowing from the cooling device 91 does not flow to the machine tool spindle 81, but flows back to the cooling device 91 from the cold liquid shortcut channel 11. The operation of the pump 33 will drive the liquid in the hot liquid shortcut channel 21 to the discharge valve 25 and to the liquid outlet channel 27. The control source 31 uses the temperature measured by the temperature sensor 37 to control the heater 35 heating the liquid in the liquid outlet channel 27. The heated liquid flows into the machine tool spindle 81 to provide a heating effect, and the liquid flowing from the machine tool spindle 81 enters the reflux liquid inlet channel 29 and then returns to the hot liquid shortcut channel 21 through the hot liquid electrical control valve 23. That is, the heated liquid does not return to the cooling device 91, but circulates in the machine tool spindle 81, the reflux liquid inlet channel 29, the hot liquid shortcut channel 21 and the liquid outlet channel 27, and at the same time, it is heated by the heater 35. Because the amount of liquid in this cycle is much less than the amount of liquid in the cooling device 91, it can be easily heated to increase the temperature to achieve the effect of rapid heating of the machine tool spindle 81.

It can be seen from the above, the present invention can provide an additional heating function to the spindle of the machine tool that originally has a cooling device, and still retains its original cooling function. When cooling, the liquid provided by the cooling device 91 is passed to directly cool the machine tool spindle 81. When raising the temperature, the flow path is switched, so that the liquid of the cooling device 91 cannot flow to the machine tool spindle 81, and the liquid flowing out of the machine tool spindle 81 forms an independent circulation channel, and the liquid in the independent circulation channel is heated to achieve the effect of rapid heating and temperature raising.

Figure 6:
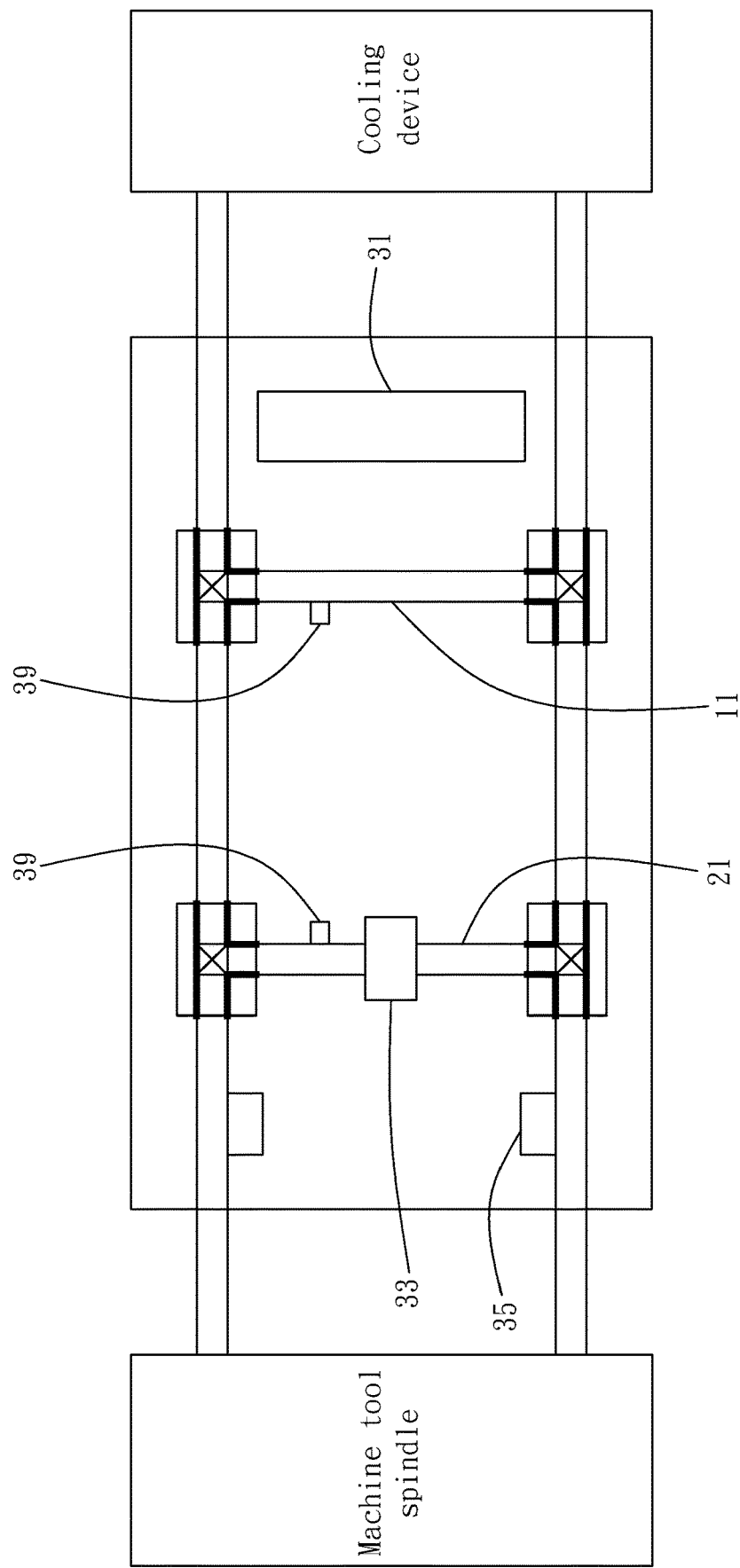
FIG. 6 is another system block diagram of the first preferred embodiment of the present invention.

As shown in FIG. 6, the present invention can also be provided with a flow sensor 39 in the cold liquid shortcut channel 11 and the hot liquid shortcut channel 21. Each flow sensor 39 is electrically connected to the control source 31. By means of the flow sensors 39, the control source 31 can detect whether the liquid in the cold liquid shortcut channel 11 and the hot liquid shortcut channel 21 is flowing, so as to confirm that the pump 33 is functioning normally.

In addition to the three-way check valves, the discharge valve 25 and the return valve 15 can also be three-way solenoid valves, which are electrically connected to the control source 31 and are switched by the control source 31 to change their flow direction. During the cooling operation, the control source 31 controls the discharge valve 25 to only allow the liquid to flow from the cold liquid electrical control valve 13 and to flow to the liquid outlet channel 27, and also controls the return valve 15 to only allow the liquid to flow from the hot liquid electrical control valve 23 and to flow to the reflux liquid release channel 19. During the heating operation, the control source 31 controls the discharge valve 25 to only allow the liquid to flow from the hot liquid shortcut channel 21 and to flow to the liquid outlet channel 27, and also controls the return valve 15 to only allow the liquid to flow from the cold liquid shortcut channel 11 and to flow to the reflux liquid release channel 19.

Figure 7:
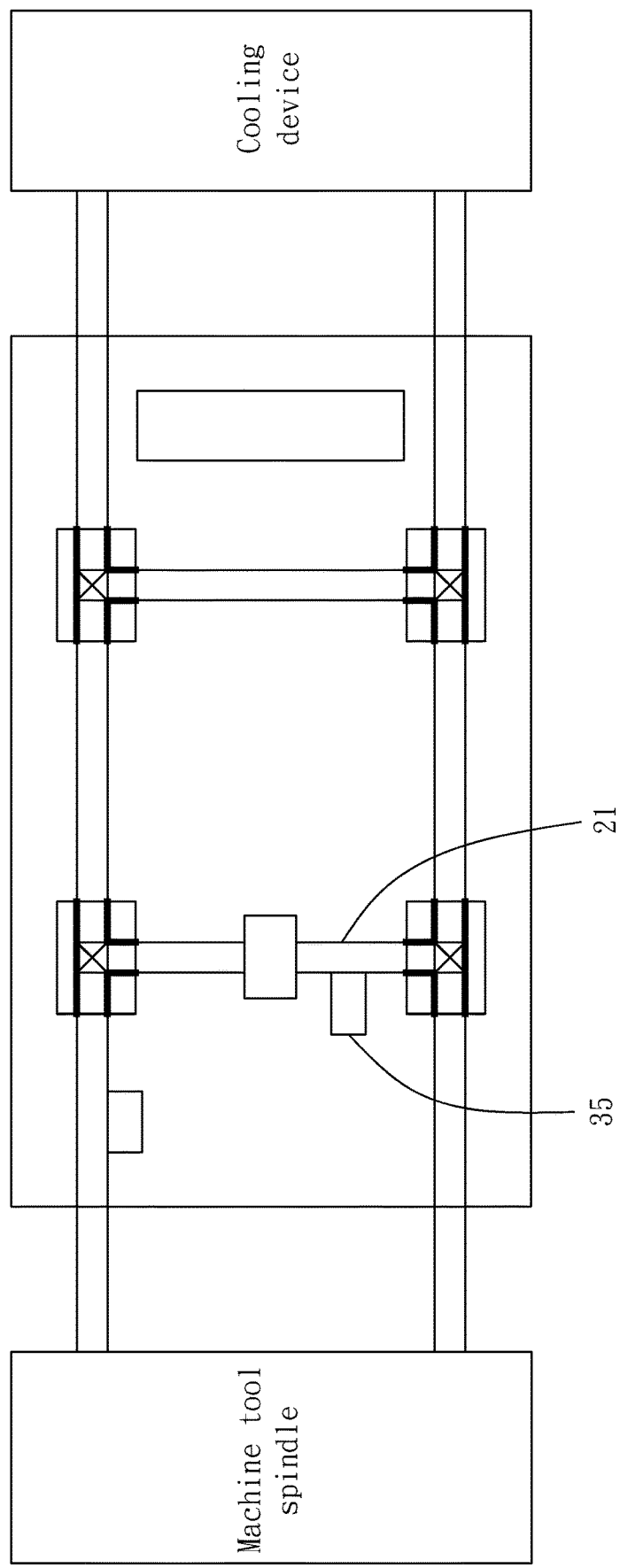
FIG. 7 is still another system block diagram of the first preferred embodiment of the present invention.
Figure 8:
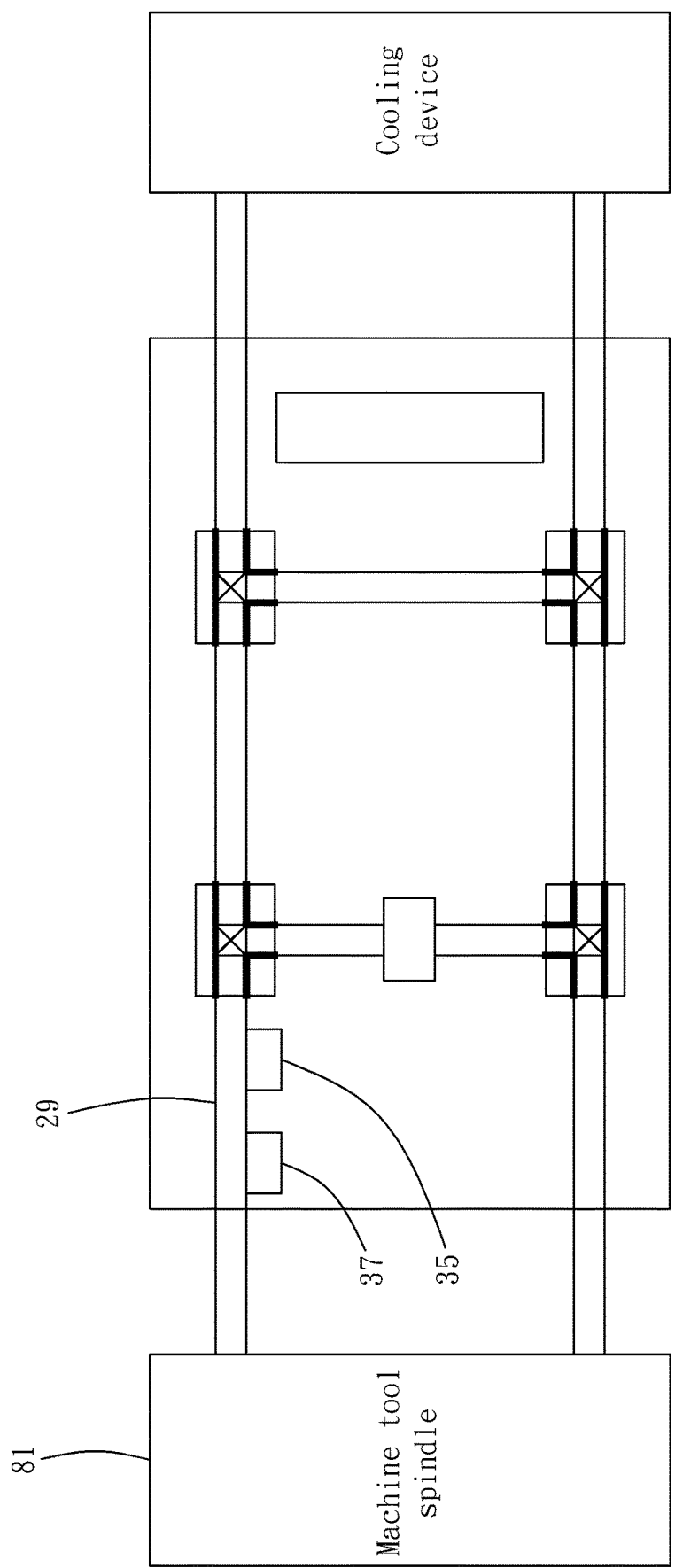
FIG. 8 is still another system block diagram of the first preferred embodiment of the present invention.

Referring to FIG. 7 and FIG. 8, the installation position of the heater 35, in addition to being located in the liquid outlet channel 27 disclosed in the first preferred embodiment, as shown in FIG. 7, can also be installed on the hot liquid shortcut channel 21, or as shown in FIG. 8, can also be installed on the reflux liquid inlet channel 29. However, the preferred position is to install the heater 35 behind the temperature sensor 37 according to the liquid flow direction, that is, the liquid first flows through the temperature sensor 37 to sense the temperature, and then flows through the heater 35 for heating. Such a way of installation can ensure that during the aforementioned heating operation, the liquid flowing out of the machine tool spindle 81 is first sensed by the temperature sensor 37 before being heated by the heater 35. Thereby, there is no inaccuracy in measuring the temperature of the liquid flowing out of the machine tool spindle 81 because the heater 35 heats the liquid first.

In addition, the pump 33 can be installed on the reflux liquid inlet channel 29 or the liquid outlet channel 27 in addition to the hot liquid shortcut channel 21. During the heating operation, after the flow path is switched, whether the pump 33 is installed on the hot liquid shortcut channel 21, the reflux liquid inlet channel 29 or the liquid outlet channel 27, it can drive the liquid to circulate through the machine tool spindle 81, the reflux liquid inlet channel 29, the hot liquid shortcut channel 21 and the liquid outlet channel 27. This way of installation can be directly understood, and the content is no longer represented graphically.

Figure 9:
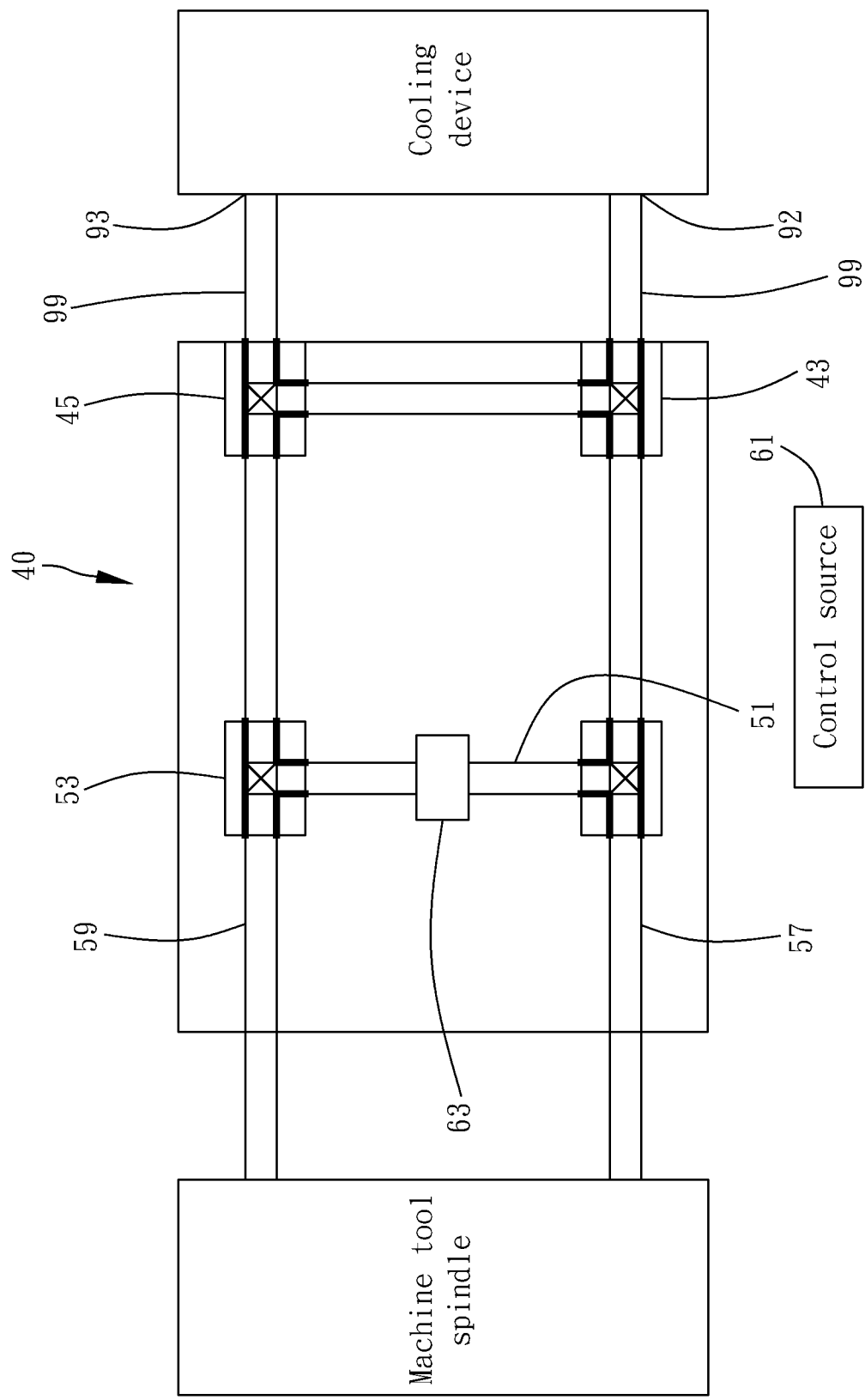
FIG. 9 is a system block diagram of a second preferred embodiment of the present invention.

Referring to FIG. 9 supplementary mechanism 40 that provides a temperature rise and fall effect to a machine tool spindle in accordance with a second preferred embodiment of the present invention is shown. This second preferred embodiment is substantially similar to the aforesaid first preferred embodiment with the exceptions outlined hereinafter.

In this second preferred embodiment, the liquid inlet channel and the reflux liquid release channel are eliminated, the cold liquid electrical control valve 43 is connected to the liquid outlet 92 of the cooling device 91 by a tube 99, and the return valve 45 is connected to the reflux port 93 of the cooling device 91 by a tube 99. Furthermore, the control source 61 is also different from the microcomputer of the first preferred embodiment. In this second preferred embodiment, an external control box (such as a machine tool control box, or an external microcomputer control module) is used as the control source 61, and wires or cable sockets (not shown) are used to electrically connected the control source 61 to the cold liquid electrical control valve 43, the hot liquid electrical control valve 53 and the pump 63. In this way, the flow direction of the liquid can be controlled by the external control source 61, and the same operating state as the aforementioned first preferred embodiment is generated.

In addition, the heater and the temperature sensor are not provided in the second preferred embodiment. During heating operation, the heat generated by the operation of the machine tool spindle 81 is mainly used for heating, and the flow direction of liquid is controlled by the control source 61, so that the liquid flowing from the machine tool spindle 81 can only pass through the reflux liquid inlet channel 59, the hot liquid shortcut channel 51 and the liquid outlet channel 57 and flow back to the machine tool spindle 81. Through this cycle, the heat energy generated by the machine tool spindle 81 itself during operation is used to provide a temperature raising effect. Although this heating effect is slower than using a heater, it is still faster than the conventional technology of heating the entire water storage tank. As for the temperature sensing part, although the temperature sensor is omitted in the second preferred embodiment, the external control source can still obtain the temperature value of the machine tool spindle 81 by the temperature sensor of the machine tool, and then perform the corresponding operation or reaction.

In the second preferred embodiment, the liquid inlet channel and the reflux liquid release channel of the first preferred embodiment are omitted, and the connection relationship between the present invention and the cooling device 91 can still be achieved. The rest of the structure of the second preferred embodiment and the achievable effects are the same as the first preferred embodiment disclosed above, and will not be repeated here.

Based on the above, it can be seen that the present invention can quickly adjust the temperature of the machine tool spindle when the temperature is increased, and the original cooling device is used when the temperature is lowered, and the cooling device originally used with the machine tool does not need to be modified and can be directly connected to the cooling pipelines. It has the effect of convenient installation.

What is claimed is:

1. A supplementary mechanism that provides a temperature rise and fall effect to a machine tool spindle, mainly used to connect to pipelines between a machine tool spindle and a cooling device, said supplementary mechanism comprising:
   a cold liquid shortcut channel;
   a cold liquid electrical control valve connected to one end of said cold liquid shortcut channel for the liquid of said cooling device to enter;
   a return valve connected to an opposite end of said cold liquid shortcut channel for the liquid to flow out to said cooling device;
   a hot liquid shortcut channel;
   a hot liquid electrical control valve connected to one end of said hot liquid shortcut channel and also connected to said return valve;
   a discharge valve connected to one end of said hot liquid shortcut channel and also connected to said cold liquid electrical control valve;
   a liquid outlet channel having one end thereof connected to said discharge valve and an opposite end thereof provided for a liquid to flow out to said machine tool spindle;
   a reflux liquid inlet channel having one end thereof connected to said hot liquid electrical control valve and an opposite end thereof provided for the liquid returning from said machine tool spindle to enter; and
   a pump installed on one of said hot liquid shortcut channel, said reflux liquid inlet channel and said liquid outlet channel and controlled by a control source to drive the liquid therein to move;
   wherein said discharge valve is to ensure that the liquid flowing through only flows to said liquid outlet channel, said return valve is to ensure that the liquid flowing through only flows to said cooling device;
   wherein said control source controls said cold liquid electrical control valve and said hot liquid electrical control valve to switch the liquid flow direction; when said control source controls said cold liquid electrical control valve so that the liquid flowing from said cooling device can only flow to said discharge valve, said control source also controls said hot liquid electrical control valve so that the liquid flowing from said reflux liquid inlet channel can only flow to said return valve; when said control source controls said cold liquid electrical control valve so that the liquid flowing from said cooling device can only flow to said cold liquid shortcut channel, said control source also controls said hot liquid electrical control valve so that the liquid flowing from said reflux liquid inlet channel can only flow to said hot liquid shortcut channel.

2. The supplementary mechanism as claimed in claim 1, further comprising a liquid inlet channel and a reflux liquid release channel, said liquid inlet channel is connected with one end thereof to said cold liquid electrical control valve for enabling the liquid of said cooling device to flow first into said liquid inlet channel and then into said cold liquid electrical control valve; said reflux liquid release channel is connected with one end thereof to said return valve so that the liquid flowing from said return valve flows first into said reflux liquid release channel and then into said cooling device.

3. The supplementary mechanism as claimed in claim 1, further comprising a heater and a temperature sensor, said heater being installed on one of said liquid outlet channel, said hot liquid shortcut channel and said reflux liquid inlet channel and controlled by said control source to provide a heating effect; said temperature sensor being installed on said reflux liquid inlet channel and electrically connected to said control source.

4. The supplementary mechanism as claimed in claim 1, wherein said control source is a microcomputer electrically connected to said cold liquid electrical control valve, said hot liquid electrical control valve and said pump.

5. The supplementary mechanism as claimed in claim 1, wherein said control source is an external control box electrically connected to said cold liquid electrical control valve, said hot liquid electrical control valve and said pump.

6. The supplementary mechanism as claimed in claim 1, wherein said cold liquid electrical control valve and said hot liquid electrical control valve are three-way solenoid valves.

7. The supplementary mechanism as claimed in claim 1, wherein said discharge valve and said return valve are three-way check valves.

8. The supplementary mechanism as claimed in claim 1, wherein said discharge valve and said return valve are three-way solenoid valves electrically connected to said control source.

9. The supplementary mechanism as claimed in claim 1, wherein said cold liquid shortcut channel and said hot liquid shortcut channel are respectively equipped with a flow sensor, and each said flow sensor is electrically connected to said control source.

\* \* \* \* \*